United States Patent
Zhang et al.

(10) Patent No.: US 12,501,331 B2
(45) Date of Patent: Dec. 16, 2025

(54) METHOD FOR SELECTING TARGET RELAY UE, NETWORK DEVICE AND UE

(71) Applicant: DATANG MOBILE COMMUNICATIONS EQUIPMENT CO., LTD., Beijing (CN)

(72) Inventors: Huiying Zhang, Beijing (CN); Yali Zhao, Beijing (CN); Hao Xu, Beijing (CN)

(73) Assignee: Datang Mobile Communications Equipment Co., Ltd., Beijing (CN)

(*) Notice: Subject to any disclaimer, the term of this patent is extended or adjusted under 35 U.S.C. 154(b) by 330 days.

(21) Appl. No.: 18/261,929

(22) PCT Filed: Dec. 20, 2021

(86) PCT No.: PCT/CN2021/139795
§ 371 (c)(1),
(2) Date: Jul. 18, 2023

(87) PCT Pub. No.: WO2022/151926
PCT Pub. Date: Jul. 21, 2022

(65) Prior Publication Data
US 2024/0306059 A1     Sep. 12, 2024

(30) Foreign Application Priority Data
Jan. 18, 2021    (CN) .................. 202110065152.X

(51) Int. Cl.
*H04W 88/04*      (2009.01)
*H04W 36/00*      (2009.01)
(Continued)

(52) U.S. Cl.
CPC ..... *H04W 36/033* (2023.05); *H04W 36/0061* (2013.01); *H04W 36/00835* (2018.08);
(Continued)

(58) Field of Classification Search
CPC ....... H04W 36/0061; H04W 36/00835; H04W 36/304; H04W 88/04
See application file for complete search history.

(56) References Cited

U.S. PATENT DOCUMENTS

| | | |
|---|---|---|
| 2018/0092017 A1 | 3/2018 | Freda et al. |
| 2018/0139682 A1 | 5/2018 | Xu et al. |

(Continued)

FOREIGN PATENT DOCUMENTS

| | | |
|---|---|---|
| CN | 104883712 A | 9/2015 |
| CN | 106572514 A | 4/2017 |

(Continued)

OTHER PUBLICATIONS

"3rd Generation Partnership Project; Technical Specification Group Services and System Aspects; Study on system enhancement for Proximity based Services (Prose)in the 5G System(5GS)(Release 17)" 3GPP Draft; 23752-070, 3rd Generation Partnership Project (3GPP), Nov. 27, 2020.

(Continued)

*Primary Examiner* — Barry W Taylor
(74) *Attorney, Agent, or Firm* — Harness, Dickey & Pierce, P.L.C.

(57) ABSTRACT

A method for selecting a target relay UE, performed by a network device, comprises: acquiring a candidate relay UE list of a remote UE and a public land mobile network (PLMN) list; determining a target relay set by performing an access/handover decision on each candidate relay UE in the candidate relay UE list based on the PLMN list; and selecting a target relay UE from the target relay set.

17 Claims, 8 Drawing Sheets

(51) Int. Cl.
*H04W 36/30* (2009.01)
*H04W 84/04* (2009.01)

(52) U.S. Cl.
CPC ........ *H04W 36/304* (2023.05); *H04W 84/042* (2013.01); *H04W 88/04* (2013.01)

(56) References Cited

U.S. PATENT DOCUMENTS

| | | | |
|---|---|---|---|
| 2018/0295497 A1 | 10/2018 | Kim et al. | |
| 2019/0141586 A1* | 5/2019 | Olsson | H04W 72/54 |
| 2020/0107381 A1* | 4/2020 | Ahmad | H04W 88/04 |
| 2023/0145738 A1* | 5/2023 | Yang | H04W 72/40 |
| | | | 370/315 |
| 2024/0015619 A1* | 1/2024 | Pan | H04W 88/04 |
| 2024/0276327 A1* | 8/2024 | Lu | H04W 36/0061 |

FOREIGN PATENT DOCUMENTS

| | | |
|---|---|---|
| CN | 107439040 A | 12/2017 |
| CN | 113438627 A | 9/2021 |
| EP | 3282767 A1 | 2/2018 |
| WO | 2015035621 A1 | 3/2015 |
| WO | 2017012299 A1 | 1/2017 |

OTHER PUBLICATIONS

Extended European Search Report issued Jun. 5, 2024 for European application 21919113.7.
International Search Report and Written Opinion issued on Mar. 2, 2022 in International Application No. PCT/CN2021/139795.
Notice of the first review opinion issued Aug. 31, 2024 for Chinese Application 202110065152.X.

\* cited by examiner

METHOD FOR SELECTING TARGET RELAY UE, NETWORK DEVICE AND UE

CROSS-REFERENCE TO RELATED APPLICATION

This application is a national phase of International Application No. PCT/CN2021/139795 filed on Dec. 20, 2021 which is based on and claims priority to Chinese Patent Application No. 202110065152.X filed on Jan. 18, 2021, the entire content of each of which are incorporated herein by reference.

TECHNICAL FIELD

The disclosure relates to the field of communication technologies, and specifically to, a method for selecting a target relay user equipment (UE), a network device and a UE.

BACKGROUND

In an existing network, a UE directly establishes a Uu link with a base station and performs a handover from one cell to another cell. Neighboring cell information measured by the UE (the user equipment or the UE) is configured by the base station. Therefore, a source base station directly selects a target base station in a handover process and notifies it to the UE, so that the target base station may provide services for the UE.

SUMMARY

In a first aspect, a method for selecting a target relay UE is provided, The method is applicable to a network device and includes:
  acquiring a candidate relay UE list of a remote UE and a public land mobile network (PLMN) list;
  determining a target relay set by performing an access/handover decision on each candidate relay UE in the candidate relay UE list based on the PLMN list; and
  selecting a target relay UE from the target relay set.
In a second aspect, a method for selecting a target relay UE is further provided. The method is applicable to a remote UE and includes:
  acquiring a candidate relay UE list of the remote UE and a PLMN list;
  determining a target relay set by performing an access/handover decision on each candidate relay UE in the candidate relay UE list based on the PLMN list; and
  selecting a target relay UE from the target relay set.
In a third aspect, a network device is further provided and includes: a memory, a transceiver and a processor:
  in which the memory is configured to store a computer program;
  the transceiver is configured to transmit and receive data under a control of the processor; and
  the processor is configured to read the computer program in the memory and perform: acquiring a candidate relay UE list of a remote UE and a PLMN list: determining a target relay set by performing an access/handover decision on each candidate relay UE in the candidate relay UE list based on the PLMN list; and selecting a target relay UE from the target relay set.

DETAILED DESCRIPTION

Figure 1:
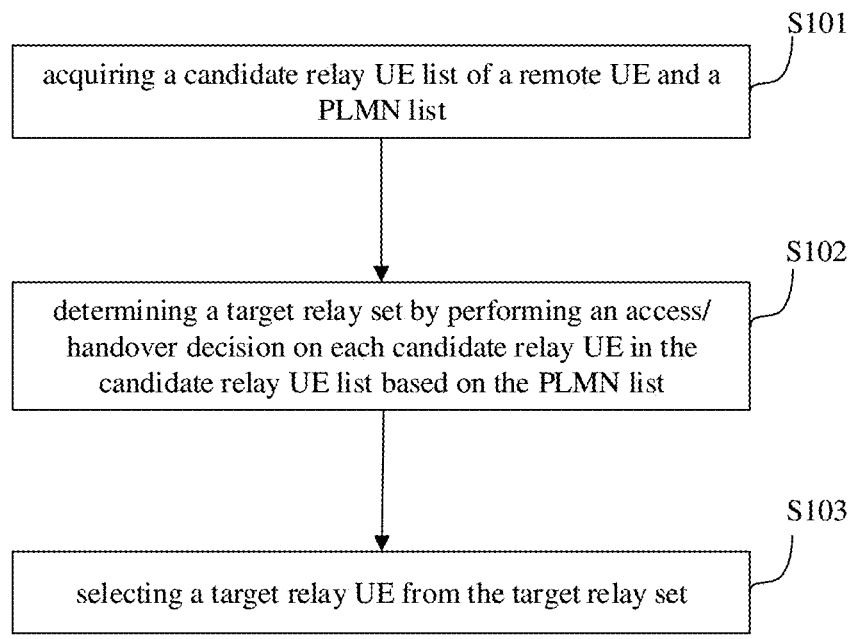
FIG. 1 is a flowchart illustrating a method for selecting a target relay UE on a network device side in embodiments of the disclosure.

Embodiments of the disclosure will be described in more detail below with reference to the accompanying drawings. Although the embodiments of the disclosure are illustrated in the drawings, it should be understood that the disclosure may be implemented in various forms and should not be limited by the embodiments set forth herein. Rather, the embodiments are provided for a thorough understanding of the disclosure and may fully convey the scope of the disclosure to those skilled in the art.

In embodiments of the disclosure, in the cellular network communication, a UE and a network side device perform transmission on uplink and downlink data/uplink and downlink control information via a Uu interface. In a direct communication system, the direct communication is a mode that adjacent UEs may perform data transmission in a near distance range via a direct communication link (also referring to a sidelink or a PC5). A wireless interface corresponding to the sidelink is referred to a direct communication interface (also referring to a sidelink interface or a PC5 interface). In a system where the UE accesses the network via a relay, it may consider introducing the relay to expand a network coverage. The relay itself may be a UE with a relay function. For a UE-to-Network Relay, an interface between the relay and the network is the Uu interface, and an interface between the relay and the relayed UE is the sidelink interface or the PC5 interface. A link between the relay and the network may be referred to a backhaul link (BH) for the remote UE. In order to simplify description, after the relay is introduced, the following terms may be introduced: direct link: a UE is directly linked to a network device via a Uu interface; and indirect link: a UE is linked to a network device via a relay device.

As illustrated in FIG. 1, a method for selecting a target relay UE is provided in embodiments of the disclosure and applicable to a network device. The method includes the following steps.

At step S101, a candidate relay UE list of a remote UE and a PLMN list are acquired.

At S102, a target relay set is determined by performing an access/handover decision on each candidate relay UE in the candidate relay UE list based on the PLMN list.

At S103, a target relay UE is selected from the target relay set.

In embodiments of the disclosure, when the target relay UE is selected, the PLMN list is considered. The target relay UE that provides the relay service for the remote UE is determined by performing the access/handover decision on each candidate relay UE in the candidate relay UE list based on the PLMN list, which avoids that the remote UE is handed over to the relay UE that may not provide the relay service.

Figure 2:
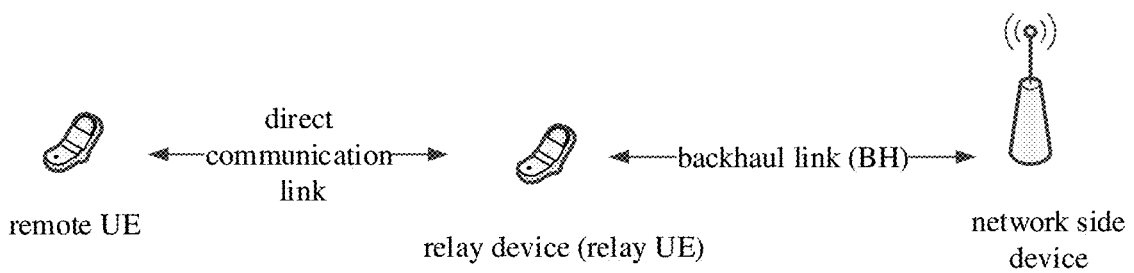
FIG. 2 is a diagram illustrating a structure of a UE-to-Network Relay link in embodiments of the disclosure.

As illustrated in FIG. 2, an interface between the relay UE and the network is a Uu interface and an interface between the remote UE and the relay UE is a direct communication interface (a sidelink interface or a P5 interface); and a link between the relay UE and the network side device is referred to as a backhaul link (BH) for the remote UE.

In the above embodiments of the disclosure, a measurement result of the remote UE is screened by the network device based on the PLMN. The network device herein may be a source serving base station of the remote UE, a core network element or a roadside unit (RSU) similar to the base station. The candidate relay UE list is reported by the remote UE to the source serving base station. The source serving base station of the remote UE determines the target relay set of the remote UE for handover by performing the PLMN access/handover decision on each candidate relay UE in the candidate relay UE list reported by the remote UE, selects the target relay UE from the handover target relay set, and notifies it the remote UE.

In the embodiments of the disclosure, when the UE accesses the network via the relay or is handed over from direct link to indirect link or is handed over between relay UEs, the target relay UE is determined. The target relay UE that may provide the relay service for the remote UE is determined by performing the access/handover decision on each candidate relay UE in the candidate relay UE list based on the PLMN list, which avoids that the remote UE is handed over to the relay UE that may not provide the relay service for the remote UE.

The source serving base station of the remote UE may include:

for the remote UE that initially accesses the network via the relay, the source serving base station being the serving base station of the relay UE selected by the remote UE based on discovery and an initial relay selection;

for the remote UE that is directly linked to the network, the source serving base station being the serving base station of the remote UE; and for the remote UE that is indirectly linked to the network, the source serving base station being the serving base station of the relay UE that provides the relay service for the remote UE.

In embodiments of the disclosure, at step S101, acquiring the PLMN list includes:

acquiring a relay service PLMN list of each candidate relay UE in the candidate relay UE list and/or a relay access PLMN list of the remote UE; or acquiring a PLMN list of a serving base station of each candidate relay UE in the candidate relay UE list.

The relay service PLMN list of the relay UE refers to a PLMN list that may provide the relay service for the remote UE under the grant of the UE. The relay service PLMN list may be a serving PLMN of the relay UE or a PLMN list obtained by the relay UE from the serving base station or a PLMN list allowed to as the relay under the grant of each relay UE.

The relay access PLMN list of the remote UE refers to a PLMN list that may access the network via the relay under the grant of the UE. The relay access PLMN list may be same as or different from the PLMN list of the remote UE that accesses the network via the sidelink.

The PLMN list of the serving base station means that the UE in the PLMN list may access the network through the base station, thus it is deemed that the PLMN list is a PLMN list of the base station.

In some embodiments, acquiring the relay service PLMN list of each candidate relay UE in the candidate relay UE list and/or the relay access PLMN list of the remote UE includes:

acquiring the relay service PLMN list of each candidate relay UE in the candidate relay UE list and/or the relay access PLMN list of the remote UE from the remote UE; and acquiring the relay service PLMN list of each candidate relay UE in the candidate relay UE list and/or the relay access PLMN list of the remote UE from a core network or serving base stations of candidate relay UEs under a case of being unable to acquire the relay service PLMN list of each candidate relay UE in the candidate relay UE list and/or the relay access PLMN list of the remote UE from the remote UE.

That is, the remote UE may send the candidate relay UE list to the network device, so that the network device may acquire the relay service PLMN list of each candidate relay UE and/or the relay access PLMN list of the remote UE based on the received candidate relay UE list reported by the remote UE; and when the relay service PLMN list of each candidate relay UE in the candidate relay UE list and/or the relay access PLMN list of the remote UE are not acquired from the candidate relay UE list reported by the remote UE, it is triggered to acquire the relay service PLMN list of each candidate relay UE in the candidate relay UE list and/or the relay access PLMN list of the remote UE from the core network or the serving base stations of candidate relay UEs.

In embodiments of the disclosure, acquiring the relay service PLMN list of each candidate relay UE in the candidate relay UE list may include:

receiving information of the candidate relay UE reported by the remote UE; and determining the relay service PLMN list based on the information of the candidate relay UE.

The information of the candidate relay UE includes at least one of:

identity information of the candidate relay UE: for example, an application layer ID for identifying the relay UE carried in the relay UE discovery message, or a Layer-2 ID of the relay UE, or a relay ID allocated by the network for the relay UE;

channel quality information of the candidate relay UE, measured by the remote UE, for example, a sidelink-reference signal receiving power (SL-RSRP) of a discovery (PC5 discovery) message sent by the candidate relay UE, measured by the remote UE: or relay service PLMN lists of candidate relay UEs.

When the network device is the source serving base station of the remote UE, acquiring the relay service PLMN list of each candidate relay UE in the candidate relay UE list and the relay access PLMN list of the remote UE network device of the remote UE may include:

acquiring the relay service PLMN list of each candidate relay UE in the candidate relay UE list and/or the relay access PLMN list of the remote UE from a PLMN list maintained by the network device; and acquiring the relay service PLMN list of each candidate relay UE in the candidate relay UE list and/or the relay access PLMN list of the remote UE from the PLMN list maintained by the network device under a case of being able to acquire the relay service PLMN list of each candidate relay UE in the candidate relay UE list and/or the relay access PLMN list of the remote UE from the PLMN list maintained by the network device.

Acquiring the relay service PLMN list of each candidate relay UE in the candidate relay UE list and the relay access PLMN list of the remote UE network device of the remote UE may further include:

acquiring the relay service PLMN list of each candidate relay UE in the candidate relay UE list and/or the relay access PLMN list of the remote UE from the PLMN list maintained by the network device; and acquiring the relay service PLMN list of each candidate relay UE in the candidate relay UE list and/or the relay access PLMN list of the remote UE from a core network or serving base stations of candidate relay UEs under a case of being unable to acquire the relay service PLMN list of each candidate relay UE in the candidate relay UE list and/or the relay access PLMN list of the remote UE from the PLMN list maintained by the network device.

In an implementation, the relay service PLMN list of each candidate relay UE in the candidate relay UE list and/or the relay access PLMN list of the remote UE are acquired from the core network or the serving base stations of candidate relay UEs.

Acquiring the relay service PLMN list of each candidate relay UE from the core network or the serving base stations of candidate relay UEs under a case of being unable to acquire the relay service PLMN list of each candidate relay UE in the candidate relay UE list and/or the relay access PLMN list of the remote UE from the PLMN list maintained by the network device may include:

when a new candidate relay UE appears, acquiring and storing the relay service PLMN list of the new candidate relay UE from the core network of the new candidate relay UE or the serving base station of the new candidate relay UE; in which the source serving base station of the remote UE maintains one relay UE list, and records the relay service PLMN list for each relay UE, and when the new relay UE appears, the relay service PLMN list is acquired and stored from the core network of the new relay UE: or, when information of the candidate relay UE reported by the remote UE is received, in response to PLMN information of the corresponding relay UE being not stored, acquiring the relay service PLMN list of the candidate relay UE from the core network or the serving base station of the candidate relay UE; in which when the source serving base station of the remote UE receives the information of the candidate relay UE reported by the remote UE, in response to the source serving base station not storing the corresponding relay PLMN information, the relay service PLMN list of the candidate relay UE is queried from the core network or the serving base station of the candidate relay UE.

In the above embodiments of the disclosure, acquiring the relay access PLMN list of the remote UE from the core network element or the serving base station of the candidate relay UE may include:

when a new remote UE appears, acquiring and storing the relay access PLMN list of the new remote UE from the core network of the new remote UE or the serving base station of the new remote UE: in which the source serving base station of the remote UE maintains one remote UE list, and records the relay service PLMN list for each remote UE, and when the new remote UE appears, acquires and stores the relay access PLMN list from the core network of the new remote UE.

Correspondingly, at step S102, determining the target relay set by performing the access/handover decision on each candidate relay UE in the candidate relay UE list based on the PLMN list includes the following steps.

At S1021, based on the relay service PLMN list of each candidate relay UE and/or the relay access PLMN list of the remote UE, an access/handover priority of each candidate relay UE in the candidate relay UE list is determined according to a PLMN selection policy.

At S1022, the target relay set is determined based on the determined access/handover priority.

The PLMN selection policy includes at least one of:
in response to a relay service PLMN list of a first relay UE including a current serving PLMN of the remote UE, setting a priority of the first relay UE as a first priority;
in response to a relay service PLMN list of a second relay UE including other PLMN in the relay access PLMN of the remote UE in addition to the current serving PLMN of the remote UE, setting a priority of the second relay UE as a second priority, the first priority being higher than or equal to the second priority;
in response to a relay service PLMN list of a third relay UE not including a PLMN in the relay access PLMN list of the remote UE, the third relay UE not serving as a candidate relay UE of the remote UE: or
in response to a relay service PLMN list of a fourth relay UE being not acquired, the fourth relay UE not serving as a candidate relay UE of the remote UE.

That is, the current serving PLMN of the remote UE is the highest priority, and the priority of the relay UE where the current serving PLMN of the remote UE is included in the relay serving PLMN list is highest:

second is other relay access PLMN of the remote UE in the relay access PLMN list of the remote UE in addition to the current serving PLMN, and the priority of the relay UE where this other relay access PLMN of the remote UE is included in the relay service PLMN list is higher;
when the relay service PLMN list of the relay UE does not include the PLMN in the relay access PLMN list of the remote UE, the relay UE is not served as the candidate relay UE of the remote UE; or
when the relay service PLMN list of the relay UE may not acquired, the relay UE is not served as the candidate relay UE of the remote UE.

Correspondingly, at step S1022, in response to a priority of a candidate relay UE being the first priority or the second priority, it is determined that the candidate relay UE is capable of providing an access/handover service for the remote UE, and the target relay set is obtained based on the candidate relay UE.

When the network device is the source serving base station of the remote UE, in response to the acquired PLMN list being the PLMN list of the serving base station of each candidate relay UE, determining the target relay set by performing the access/handover decision on each candidate relay UE in the candidate relay UE list based on the PLMN list may include:

determining whether a PLMN list of a serving base station of a candidate relay UE overlaps the relay access PLMN list of the remote UE; and in response to the PLMN list of the serving base station of the candidate relay UE overlapping the relay access PLMN list of the remote UE, adding the candidate relay UE to the target relay set.

It should be noted that, a candidate relay UE with an intersection between the PLMN list of the serving base station and the relay access PLMN list of the remote UE is placed in the handover target relay set. Further, a priority may also be given to each PLMN, and a handover priority of the candidate relay UE may be determined according to the PLMN.

In the above embodiments of the disclosure, step S103 may include at least one of:

in response to a channel quality of a direct communication interface between the remote UE and a first candidate relay UE being greater than a first threshold, using the first candidate relay UE as the target relay UE, the first candidate relay UE being a relay UE in the target relay set;

in response to a channel quality of a Uu interface of a second candidate relay UE in the target relay set being greater than a second threshold, using the second candidate relay UE as the target relay UE;

in response to a relay link load of a third candidate relay UE in the target relay set being less than a third threshold, using the third candidate relay UE as the target relay UE; or in response to an electric quantity of a fourth candidate relay UE in the target relay set being greater than a fourth threshold, using the fourth candidate relay UE as the target relay UE.

Figure 3:
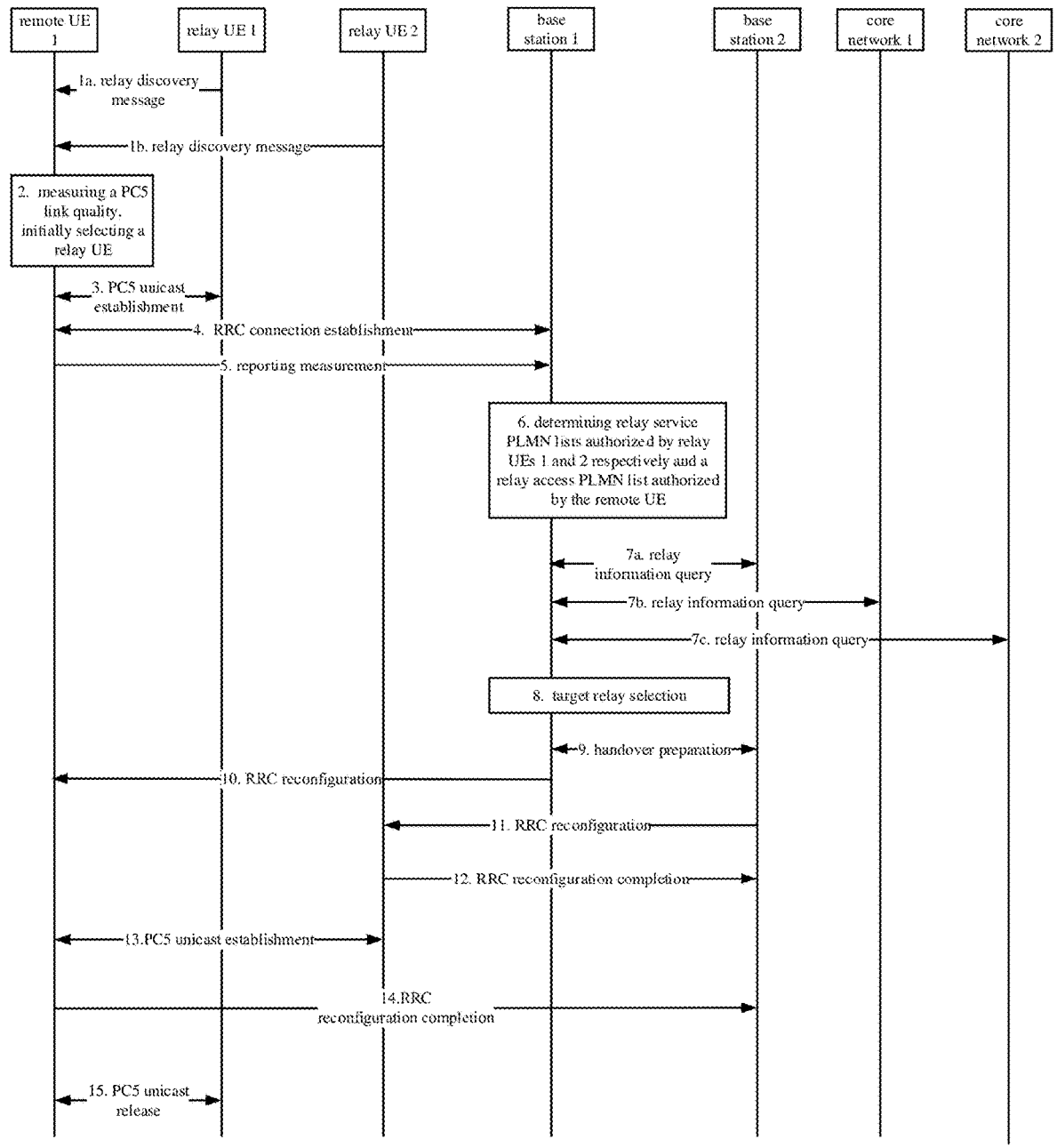
FIG. 3 is a flowchart illustrating an embodiment 1 of a method for selecting a target relay UE in embodiments of the disclosure.

The implementation process of the above method is illustrated below in combination with a specific implementation scenario:

In an implementation embodiment 1, as illustrated in FIG. 3:

a remote UE 1 accesses a network via a relay UE, a serving base station of a relay UE 1 is a base station 1, a serving core network of the relay UE 1 is a core network 1, and a relay service PLMN list of the relay UE 1 is a PLMN 1: a serving base station of a relay UE 2 is a base station 2, a serving core network of the relay UE 2 is a core network 2, a relay service PLMN list of the relay UE 2 is a PLMN 2, and a relay access PLMN list of the remote UE 1 is the PLMN 2.

At steps 1a to 1b, a Uu channel quality of the remote UE 1 is lower than a threshold 1, and the remote UE 1 may not access the network directly, and the the remote UE 1 may measure a PC5 interface channel quality of a nearby relay UE. PC5 interface channel qualities of the relay UE 1 and the relay UE 2 measured are higher than a threshold 2, and the relay UE 1 and the relay UE 2 may be taken as U2N relays.

At step 2, the remote UE 1 selects the relay UE 1 as an access relay based on an initial relay selection criterion.

At step 3, the remote UE 1 establishes a PC5 interface unicast link with the relay UE 1.

At step 4, the remote UE 1 establishes a Uu link with the base station 1 via the relay UE 1.

At step 5, the remote UE 1 reports a measurement result to the base station 1, including a candidate relay UE list (the relay UE 1, the relay UE 2) and/or PC5 link quality measurement results between the remote UE 1 and the relay UE 1 and between the remote UE 1 and the relay UE 2.

At step 6, the base station 1 stores a relay service PLMN list (PLMN 1) of the relay UE 1, and does not store a relay service PLMN list of the relay UE 2 and a relay access PLMN list of the remote UE 1.

At steps 7a and 7b, the base station 1 queries the relay service PLMN list of the relay UE 2 to the serving base station 2 of the relay UE 2 or the core network 2 of the relay UE 2. The relay service PLMN list of the relay UE 2 only includes the PLMN 2. One of steps 7a and 7b is executed.

At Step 7c, the base station 1 queries the relay access PLMN list of the remote UE 1 to the serving core network 2 of the remote UE 1, and the relay access PLMN list of the remote UE 1 only includes the PLMN 2.

At step 8, the base station 1 determines that the remote UE 1 may only use the relay UE 2 as a relay to access network based on the PLMN selection criterion, so that the relay UE 2 is selected as a target relay.

At step 9, the base station 1 interacts handover preparation information with the serving base station (the base station 2) of the relay UE 2, and the base station 2 needs to establish an interface link between the base station 2 and the core network 2 for the remote UE 1 after receiving.

At step 10, the base station 1 sends an RRC reconfiguration message to the remote UE 1 via a direct link of a Uu interface, including configuration information for handover to the relay UE 2.

At step 11, the base station 2 sends an RRC reconfiguration message to the relay UE 2, including relay link configuration information of the remote UE 1.

At step 12, the relay UE 2 sends reconfiguration completion to the base station 2.

At step 13, the remote UE 1 establishes a PC5 interface unicast link with the relay UE 2.

There is no sequential relationship between step 12 and step 13.

At step 14, the remote UE 1 sends the RRC reconfiguration completion to the base station 2 via an indirect link of the relay UE 2 to complete handover, and the remote UE 1 communicates with the network via the relay UE 2.

At step 15, the remote UE 1 releases the PC5 unicast link between the remote UE 1 and the relay UE 1, and the step 15 is optional.

The direct link and the indirect link are described below. The direct link is that the UE is directly linked to the network device via the Uu interface, and the indirect link is that the UE is linked to the network device via the relay device.

Figure 4:
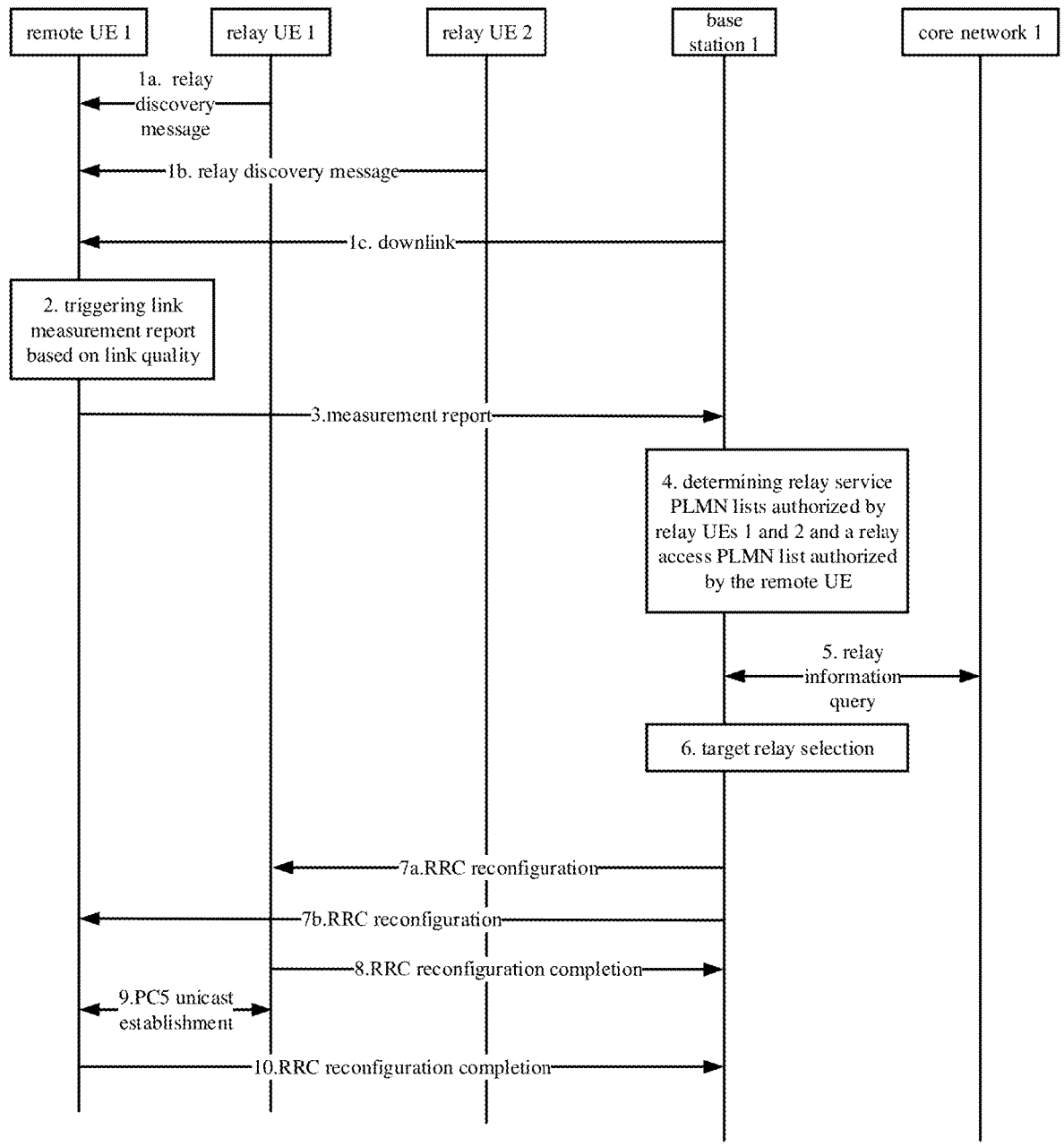
FIG. 4 is a flowchart illustrating an embodiment 2 of a method for selecting a target relay UE in embodiments of the disclosure.

In an implementation embodiment 2, as illustrated in FIG. 4:

a candidate relay UE 1 and a candidate relay UE 2 have the same serving base station and the same serving PLMN with a remote UE 1. The remote UE 1 directly accesses the network via the direct link, the serving base station is a base station 1, and the serving core network is a core network 1.

At steps 1a to 1c, the remote UE 1 measures a Uu interface channel quality and a PC5 interface channel quality of a nearby relay UE: in the process, the Uu interface channel quality of the remote UE 1 is lower than a threshold 1, and the remote UE 1 is triggered to perform discovery and measurement on the relay UE; and the remote UE 1 discovers that PC5 channel qualities of the relay UE 1 and the relay UE 2 are higher than a threshold 2.

At step 2, the remote UE triggers a measurement report based on a measurement result, and a trigger condition of the measurement report may be that the Uu interface channel quality is lower than a threshold 3, and/or the channel quality of at least one relay UE is higher than a threshold 4.

At step 3, the remote UE 1 sends the measurement report to the serving base station 1, and the measurement report includes the Uu interface channel quality of the remote UE 1, relay identities of the relay UE 1 and the relay UE 2 and corresponding PC5 interface channel qualities.

At step 4, the base station 1 receives the measurement report sent by the remote UE 1, and finds the relay service PLMN list of the relay UE 1 in the relay UE information stored in the base station 1, and the relay service PLMN list of the relay UE 1 includes a PLMN 1 and a PLMN 2. However, the base station 1 does not store the relay service PLMN list of the relay UE 2 and the relay access PLMN list of the remote UE 1.

At step 5, the base station 1 queries the stored relay service PLMN list of the relay UE 2 and the stored relay access PLMN list of the remote UE 1 to the serving core network 1 of the relay UE 2 and the remote UE 1, the relay service PLMN list of the relay UE 2 only includes the PLMN 1, and the relay access PLMN list of the remote UE 1 only includes the PLMN 1.

At step 6, the base station 1 determines that the relay service PLMNs of the relay UE 1 and the relay UE 2 include the serving PLMN of the remote UE 1 based on a PLMN selection criterion, and have high priorities, and the base station 1 determines the relay UE 1 as a target relay based on other criteria.

At steps 7a, 7b, the base station 1 sends an RRC reconfiguration message to the remote UE 1 via a direct link of a Uu interface, including configuration information for handover to the relay UE 1, and the base station 1 sends the RRC reconfiguration message to the relay UE 1, including relay link configuration information of the remote UE 1.

At step 8, the relay UE 1 sends reconfiguration completion to the base station 1.

At step 9, the remote UE 1 establishes a PC5 interface unicast link with the relay UE 1; and it needs to be noted that there is no sequential relationship between step 9 and step 8.

At step 10, the remote UE 1 sends the RRC reconfiguration completion to the base station 1 via an indirect link of the relay UE 2 to complete handover, and the remote UE 1 communicates with the network via the relay UE 1.

It needs to be noted that, at step 6, the base station decides the relay UE 1 as the target relay based on other criteria, including but not limited to: a PC5 interface channel quality of the relay UE 1 reported by the remote UE 1 is higher than that of the relay UE 2, or a relay load of the relay UE 1 is lower than that of the relay UE 2, or a plurality of factors are considered.

Figure 5:
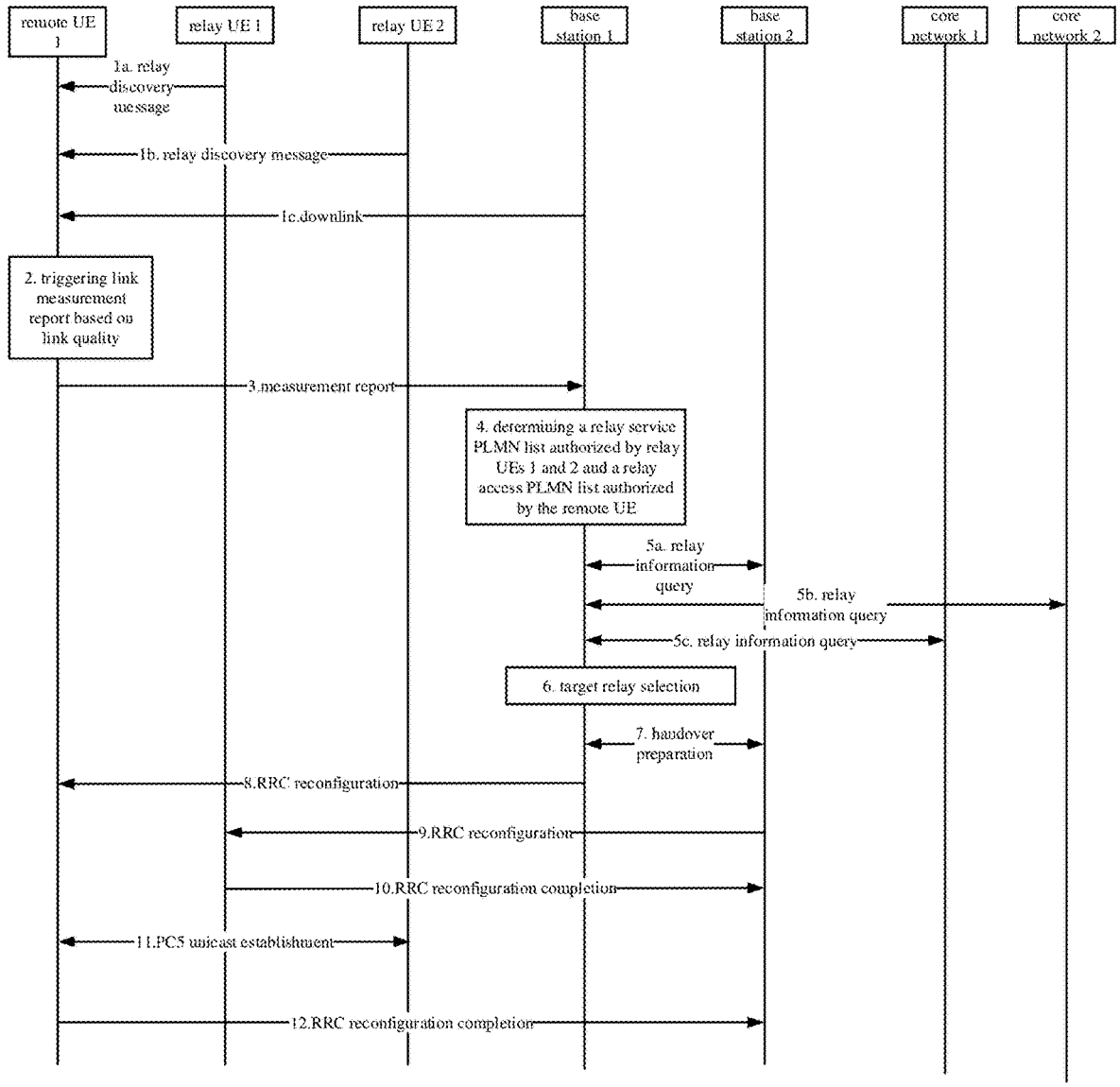
FIG. 5 is a flowchart illustrating an embodiment 3 of a method for selecting a target relay UE in embodiments of the disclosure.

In an implementation embodiment 3, as illustrated in FIG. 5:

a serving base station of the remote UE 1 is a base station 1, a serving core network of the remote UE 1 is a core network 1, and a serving PLMN of the remote UE 1 is a PLMN 1: a serving base station of the relay UE 1 and the relay UE 2 is a base station 2, a serving core network of the relay UE 1 and the relay UE 2 is a core network 2, and a serving PLMN of the relay UE 1 and the relay UE 2 is a PLMN 2. The relay service PLMN list of the relay UE 1 includes the service PLMN of the remote UE 1, and the relay service PLMN list of the relay UE 1 includes a PLMN2 and a PLMN3: the relay service PLMN list of the relay UE 2 does not include the serving PLMN of the remote UE 1, and the relay service PLMN list of the relay UE 2 includes a PLMN2 and the relay access PLMN list of the remote UE 1 includes a PLMN1 and a PLMN3.

At steps 1a to 1b, a Uu channel quality of the remote UE 1 is lower than a threshold 1, and the remote UE 1 may not access the network directly, and measure a PC5 interface channel quality of a nearby relay UE. PC5 interface channel qualities of the relay UE 1 and the relay UE 2 measured are higher than a threshold 2, and may be taken as U2N relays.

At step 2, the remote UE 1 selects the relay UE 1 as an access relay based on an initial relay selection criterion.

At step 3, the remote UE 1 establishes a PC5 interface unicast link with the relay UE 1.

At step 4, the base station 1 does not store relay service PLMN lists of the relay UE 1 and the relay UE 2 and a relay access PLMN list of the remote UE 1.

At steps 5a, 5b, the base station queries the relay service PLMN lists of the relay UE 1 and the relay UE 2 to the serving base station 2 of the relay UE 1 and the relay UE 2 or the core network 2 of the relay UE 1 and the relay UE 2. The relay service PLMN list of the relay UE 1 includes a PLMN1 and a PLMN2, and the relay service PLMN list of the relay UE 2 only includes a PLMN2.

At step 5c, the base station 1 queries the relay access PLMN list of the remote UE 1 to the serving core network 1 of the remote UE 1, and the relay access PLMN list of the remote UE 1 only includes the PLMN 1.

At step 6, the base station 1 determines that the relay UE 1 has a high priority based on a PLMN selection criterion. The relay UE is selected as a target relay.

At step 7, the base station 1 interacts handover preparation information with the serving base station (the base station 2) of the relay UE 1, and the base station 2 needs to establish an interface link between the base station 2 and the core network 1 for the remote UE 1 after receiving.

At step 8, the base station 1 sends an RRC reconfiguration message to the remote UE 1 via a direct link of a Uu interface, including configuration information for handover to the relay UE 1.

At step 9, the base station 2 sends an RRC reconfiguration message to the relay UE 1, including relay link configuration information of the remote UE 1.

At step 10, the relay UE 1 sends reconfiguration completion to the base station 2.

At step 11, the remote UE 1 establishes a PC5 interface unicast link with the relay UE 1; and it needs to be noted that there is no sequential relationship between step 11 and step 10.

At step 12, the remote UE 1 sends the RRC reconfiguration completion to the base station 2 via an indirect link of the relay UE 2 to complete handover, and the remote UE 1 communicates with the network via the relay UE 1.

The difference between the process of the implementation embodiment 3 in the disclosure and the process of the implementation embodiment 2 in the disclosure is that the remote UE 1 needs to be handed over across PLMNs, and the base station 2 needs to establish an interface UE context link between the base station 2 and the core network of the PLMN3 for the remote UE 1 after receiving the handover preparation from the base station.

In an implementation embodiment 4, a serving base station of the remote UE 1 is a base station 1 and a serving core network of the remote UE 1 is a core network 1, and a serving PLMN of the remote UE 1 is a PLMN 1: a serving base station of the relay UE 1 and the relay UE 2 is a base station 2, a serving core network of the relay UE 1 and the relay UE 2 is a core network 2, and a serving PLMN of the relay UE 1 and the relay UE 2 is a PLMN 2. The relay service PLMN list of the relay UE 1 includes a PLMN2 and a PLMN3, the relay service PLMN list of the relay UE 2 includes a PLMN2, and the relay service PLMN list of the remote UE 1 only includes a PLMN1.

In this case, the base station 1 does not hand over the remote UE 1 excluding the relay UE 1 and the relay UE 2 as target relays, and the remote UE needs to continue discovering and measuring other relay UEs.

In an implementation embodiment 5, a serving base station of the remote UE 1 is a base station 1 and a serving core network of the remote UE 1 is a core network 1, and a serving PLMN of the remote UE 1 is a PLMN 1: a serving base station of the relay UE 1 and the relay UE 2 is a base station 2, a serving core network of the relay UE 1 and the relay UE 2 is a core network 2, and a serving PLMN of the relay UE 1 and the relay UE 2 is a PLMN 2. The PLMN list supported by the base station includes a PLMN1 and a PLMN2, and the relay access PLMN list of the remote UE 1 includes a PLMN1. The relay UE 1 and the relay UE 2 may be taken as target relays of the remote UE, and the base station 1 selects the relay UE 1 as a target relay based on other criteria.

In an implementation embodiment 6, a serving base station of the remote UE 1 and the relay UE 1 is a base station 1 and a serving core network of the remote UE 1 and the relay UE 1 is a core network 1, and a serving PLMN of the remote UE 1 and the relay UE 1 is a PLMN 1: a serving base station of the relay UE 2 is a base station 2, a serving core network of the relay UE 2 is a core network 2, and a serving PLMN of the relay UE 2 is a PLMN 2. The PLMN list supported by the base station 2 only includes a PLMN2, and the relay access PLMN list of the remote UE 1 only includes a PLMN 1. The base station selects the relay UE 1 as a target relay based on a PLMN criterion.

In an implementation embodiment 7, the remote UE 1 itself screens a PLMN. The remote UE 1 accesses the network via the relay. A serving base station of the relay UE 1 and the relay UE 2 is a base station 1, a serving core network of the relay UE 1 and the relay UE 2 is a core network 1, and a relay service PLMN list of the relay UE 1 and the relay UE 2 is a PLMN 1; a serving base station of a relay UE 3 is a base station 2, a serving core network of the relay UE 3 is a core network 2, and a relay service PLMN list of the relay UE 3 is a PLMN 2. A relay access PLMN list of the remote UE 1 is a PLMN 1.

In the above embodiments of the disclosure, when the target relay UE is selected, the PLMN list is considered. The target relay UE that may provide the relay service for the remote UE is determined by performing the access/handover decision on each candidate relay UE in the candidate relay UE list based on the PLMN list, which avoids that the remote UE is handed over to the relay UE that may not provide the relay service.

Figure 6:
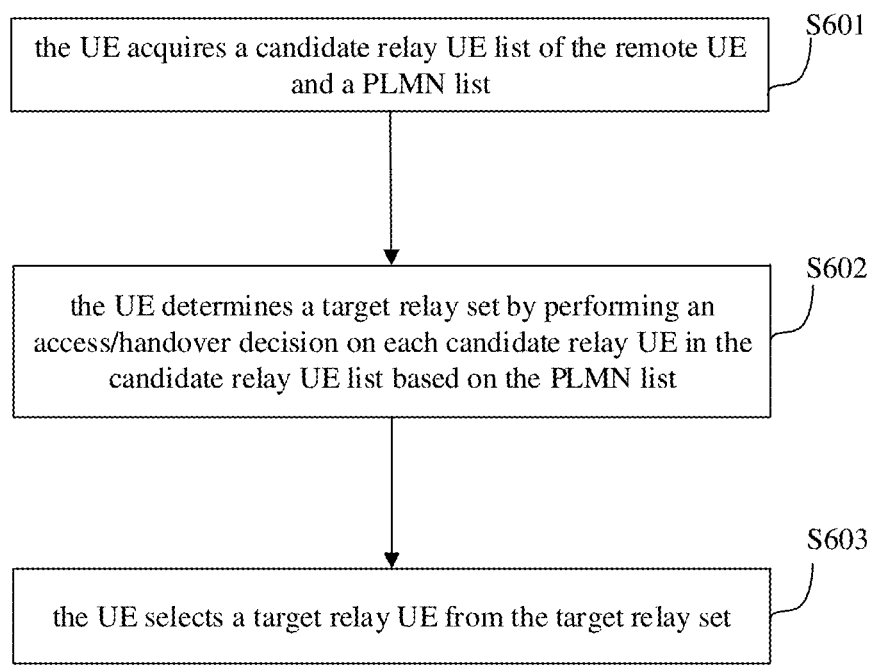
FIG. 6 is a flowchart illustrating a method for selecting a target relay UE on a UE side in embodiments of the disclosure.

As illustrated in FIG. 6, a method for selecting a target relay UE is provided in embodiments of the disclosure and applicable to a UE. The UE is a remote UE. The method includes the following steps.

At step S601, a candidate relay UE list of the remote UE and a PLMN list are acquired.

At step S602, a target relay set is determined by performing an access/handover decision on each candidate relay UE in the candidate relay UE list based on the PLMN list.

At step S603, a target relay UE is selected from the target relay set.

In the embodiments, when the remote UE selects the target relay UE during handover between relay UEs, the target relay set is determined by performing the access/handover decision on each candidate relay UE in the candidate relay UE list based on the PLMN list; and the target relay UE is selected from the target relay set, and further the network may be accessed through the target relay UE, which avoids that the remote UE is handed over to the relay UE that may not provide the relay service.

In embodiments of the disclosure, at step S601, acquiring the PLMN list may include:
acquiring a relay service PLMN list of each candidate relay UE and/or a relay access PLMN list of the remote UE.

In some embodiments, acquiring the relay service PLMN list of each candidate relay UE include at least one of:
acquiring the relay service PLMN list of each candidate relay UE from broadcast information of relay UEs;
acquiring the relay service PLMN list of each candidate relay UE from discovery messages of relay UEs;
acquiring the relay service PLMN list of each candidate relay UE from a serving base station of the remote UE; or
acquiring the relay service PLMN list of each candidate relay UE from a server or a core network.

The core network element is an access and mobility management function (AMF).

In embodiments of the disclosure, step S602 may include:
determining whether the relay service PLMN list of each candidate relay UE overlaps the relay access PLMN list of the remote UE, and adding the candidate relay UE to the target relay set in response to overlapping.

In embodiments of the disclosure, the remote UE reports the information of the determined target relay set to the network device.

In embodiments of the disclosure, selecting the target relay UE from the target relay set includes:
receiving, by the remote UE, the target relay UE sent by a source base station of the remote UE, in which the target relay UE is selected by the source base station of the remote UE from the target relay set: or directly selecting by the remote UE from the target relay set.

In embodiments of the disclosure, step S603 may include at least one of:
in response to a channel quality of a direct communication interface between the remote UE and a first candidate relay UE being greater than a first threshold, using the first candidate relay UE as the target relay UE, the first candidate relay UE being a relay UE in the target relay set;
in response to a channel quality of a Uu interface of a second candidate relay UE in the target relay set being greater than a second threshold, using the second candidate relay UE as the target relay UE;
in response to a relay link load of a third candidate relay UE in the target relay set being less than a third threshold, using the third candidate relay UE as the target relay UE; or
in response to an electric quantity of a fourth candidate relay UE in the target relay set being greater than a fourth threshold, using the fourth candidate relay UE as the target relay UE.

Figure 7:
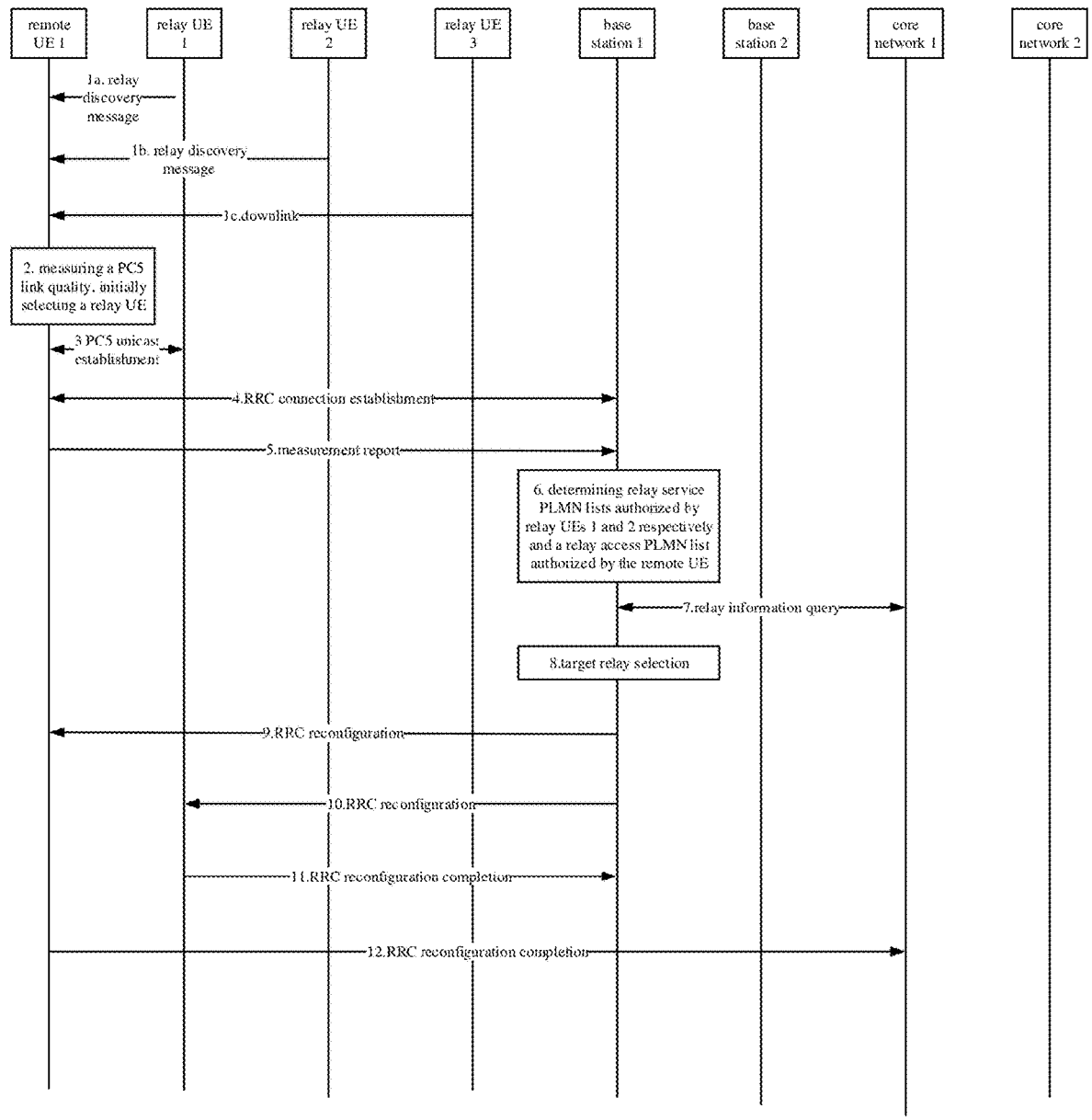
FIG. 7 is a flowchart illustrating an embodiment 8 of a method for selecting a target relay UE in embodiments of the disclosure.

The implementation process of the above method is illustrated below in combination with a specific implementation scenario:

In an implementation embodiment 8, as illustrated in FIG. 7, the remote UE 1 itself screens a PLMN. The remote UE 1 accesses the network via the relay UE. A serving base station of the relay UE 1 and the relay UE 2 is a base station 1, a serving core network of the relay UE 1 and the relay UE 2 is a core network 1, and a relay service PLMN list of the relay UE 1 and the relay UE 2 is a PLMN 1: a serving base station of the relay UE 3 is a base station 2, a serving core network of the relay UE 3 is a core network 2, and a relay service PLMN list of the relay UE 3 is a PLMN 2. A relay access PLMN list of the remote UE 1 is a PLMN 1.

At steps 1a to 1c, a Uu channel quality of the remote UE 1 is lower than a threshold 1, and the remote UE 1 may not access the network directly and measure a PC5 interface channel quality of a nearby relay UE. PC5 interface channel qualities of the relay UE 1, the relay UE 2 and the relay UE 3 measured are higher than a threshold 2, and the relay UE 1, the relay UE 2 and the relay UE 3 may be taken as U2N relays. The remote UE 1 acquires relay service PLMN lists of the relay UE 1, the relay UE 2 and the relay UE 3.

At step 2, the remote UE 1 selects the relay UE 1 as an access relay based on a PLMN selection criterion and an initial relay selection.

At step 3, the remote UE 1 establishes a PC5 interface unicast link with the relay UE 1.

At step 4, the remote UE 1 establishes a Uu link with the base station 1 via the relay UE 1.

At step 5, the remote UE 1 reports a measurement result to the base station 1, including a candidate relay list (the relay UE 1, the relay UE 2) and/or PC5 link quality measurement results between the remote UE 1 and the relay UE 1 and between the remote UE 1 and the relay UE 2. Step 5 may be combined with step 4. For example, the remote UE carries a measurement result in an RRC establishment completion message. Step 5 may be independently reported. At step 5, the candidate relay UE list reported by the remote UE 1 does not include the relay UE 3 that the PLMN does not meet the condition.

At step 6, the base station 1 stores the relay service PLMN list (PLMN 1) of the relay UE 1, and does not store the relay service PLMN list of the relay UE 2 and the relay access PLMN list of the remote UE 1.

At step 7, the base station 1 queries the relay service PLMN list of the relay UE 2 to the core network 1 of the relay UE 2. The relay service PLMN list of the relay UE 2 only includes a PLMN 1. The base station 1 queries the relay access PLMN list of the remote UE 1 to the serving core network 1 of the remote UE 1, and the relay access PLMN list of the remote UE 1 only includes the PLMN 1.

At step 8, the base station 1 selects the relay UE 1 as a relay of an access network based on a PLMN selection criterion and a relay selection criterion.

At step 9, the base station 1 sends an RRC reconfiguration message to the remote UE 1 via a direct link of a Uu interface, including configuration information of the relay UE 1 as a relay.

At step 10, the base station 1 sends the RRC reconfiguration message to the relay UE 1, including relay link configuration information of the remote UE 1.

At step 11, the relay UE 1 sends reconfiguration completion to the base station 1.

There is no sequential relationship between step 10 and step 11.

At step 12, the remote UE 1 sends the RRC reconfiguration completion to the base station 1 via an indirect link of the relay UE 1 to complete handover. And the remote UE 1 communicates with the network via the relay UE 1.

It needs to be noted that, the remote UE in the embodiment 8 of the disclosure matches based on the relay access PLMN list stored in the remote UE itself (step 6) and the PLMN list sent by the candidate relay UE (step 7). Step 7 may be performed alternatively based on the embodiment. As illustrated in FIG. 7, the embodiment is matched only by taking the relay access PLMN list stored in the remote UE itself. Therefore, step 7 may not be performed.

Figure 8:
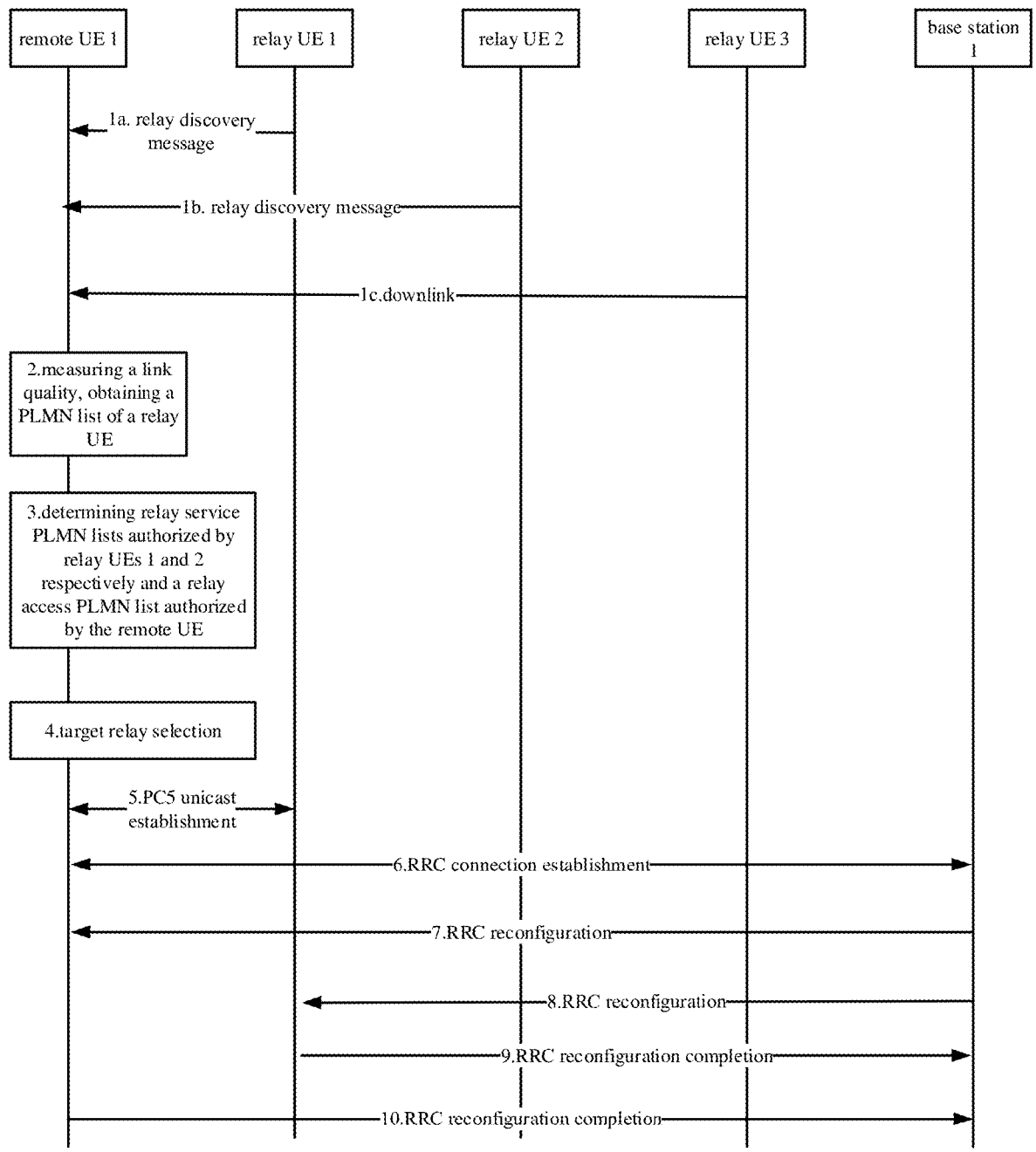
FIG. 8 is a flowchart illustrating an embodiment 9 of a method for selecting a target relay UE in embodiments of the disclosure.

In an implementation embodiment 9, as illustrated in FIG. 8, the remote UE 1 itself screens a PLMN. The remote UE 1 accesses the network via the relay. A serving base station of the relay UE 1 and the relay UE 2 is a base station 1, and a relay service PLMN list of the relay UE 1 and the relay UE 2 is a PLMN 1; a serving base station of the relay UE 3 is a base station 2 (not shown in the figure), a serving core network of the relay UE 3 is a core network 2 (not shown in the figure), and a relay service PLMN list of the relay UE 3 is a PLMN 2. A relay access PLMN list of the remote UE 1 is a PLMN 1.

At steps 1a to 1c, a Uu channel quality of the remote UE 1 is lower than a threshold 1, and the remote UE 1 may not access the network directly and measure a PC5 interface channel quality of a nearby relay UE. PC5 interface channel qualities of the relay UE 1, the relay UE 2 and the relay UE 3 measured are higher than a threshold 2, and the relay UE 1, the relay UE 2 and the relay UE 3 may be taken as U2N relays. The remote UE 1 acquires relay service PLMN lists of the relay UE 1, the relay UE 2 and the relay UE 3.

At step 2, the remote UE 1 measures a link quality and acquires a PLMN list of the relay UE.

At step 3, the remote UE 1 determines relay service PLMN lists authorized by relay UEs 1 and 2 respectively and a relay access PLMN list authorized by the remote UE; and selects the relay UE 1 as a relay of an access network for the remote UE 1 based on a PLMN selection criterion and a relay selection criterion.

At step 4, a target UE is selected.

At step 5, the remote UE 1 establishes a PC5 unicast with the relay UE 1.

At step 6, the remote UE 1 sends an RRC connection establishment to the base station 1.

At steps 7 to 10, the remote UE 1 sends RRC reconfiguration completion to the base station 1 via an indirect link of the relay UE 1 to complete handover. And the remote UE 1 communicates with the network via the relay UE 1.

In the embodiments of the disclosure, the remote UE determines the target relay set by performing the access/handover decision on each candidate relay UE in the candidate relay UE list based on a relay service PLMN list of each candidate relay UE in the candidate relay UE list and the relay access PLMN list of the remote UE that are stored itself, and further acquires the target relay UE that may provide the relay service for the remote UE from the target relay set, which avoids that the remote UE is handed over to the relay UE that may not provide the relay service.

Figure 9:
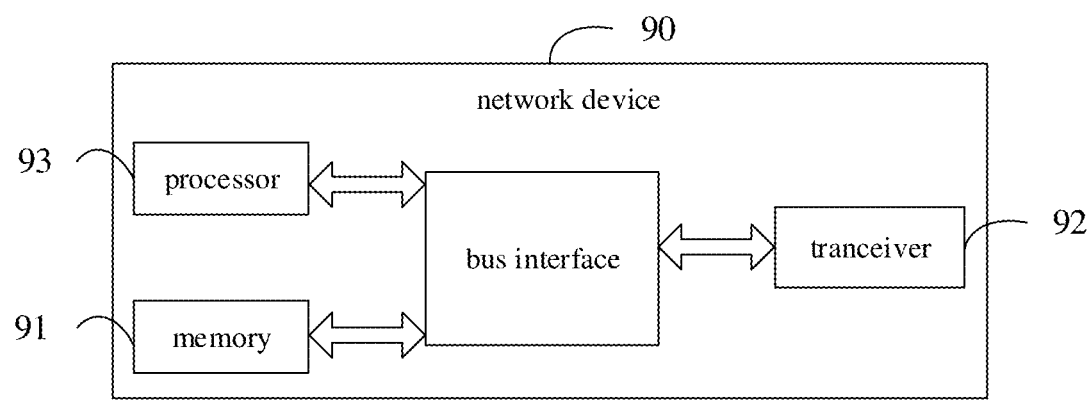
FIG. 9 is a block diagram illustrating a network device in embodiments of the disclosure.

As illustrated in FIG. 9, a network device is further provided in embodiments of the disclosure and includes: a memory 91, a transceiver 92 and a processor 93.

The memory 91 is configured to store a computer program.

The transceiver 92 is configured to transmit and receive data under a control of the processor.

The processor 93 is configured to read the computer program in the memory and perform: acquiring a candidate relay UE list of a remote UE and a PLMN list; determining a target relay set by performing an access/handover decision on each candidate relay UE in the candidate relay UE list based on the PLMN list; and selecting a target relay UE from the target relay set.

In some embodiments, acquiring the PLMN list includes:
acquiring a relay service PLMN list of each candidate relay UE in the candidate relay UE list and/or a relay access PLMN list of the remote UE; or
acquiring a PLMN list of a serving base station of each candidate relay UE in the candidate relay UE list.

In some embodiments, acquiring the relay service PLMN list of each candidate relay UE in the candidate relay UE list and/or the relay access PLMN list of the remote UE includes:
acquiring the relay service PLMN list of each candidate relay UE in the candidate relay UE list and/or the relay access PLMN list of the remote UE from a PLMN list maintained by the network device; and
acquiring the relay service PLMN list of each candidate relay UE in the candidate relay UE list and/or the relay access PLMN list of the remote UE from the PLMN list maintained by the network device under a case of being able to acquire the relay service PLMN list of each candidate relay UE in the candidate relay UE list and/or the relay access PLMN list of the remote UE from the PLMN list maintained by the network device.

In some embodiments, acquiring the relay service PLMN list of each candidate relay UE in the candidate relay UE list and/or the relay access PLMN list of the remote UE includes:
acquiring the relay service PLMN list of each candidate relay UE in the candidate relay UE list and/or the relay access PLMN list of the remote UE from a PLMN list maintained by the network device; and
acquiring the relay service PLMN list of each candidate relay UE in the candidate relay UE list and/or the relay access PLMN list of the remote UE from a core network or serving base stations of candidate relay UEs under a case of being unable to acquire the relay service PLMN list of each candidate relay UE in the candidate relay UE list and/or the relay access PLMN list of the remote UE from the PLMN list maintained by the network device.

In some embodiments, acquiring the relay service PLMN list of each candidate relay UE in the candidate relay UE list and/or the relay access PLMN list of the remote UE includes:
acquiring the relay service PLMN list of each candidate relay UE in the candidate relay UE list and/or the relay access PLMN list of the remote UE from the remote UE; and
acquiring the relay service PLMN list of each candidate relay UE in the candidate relay UE list and/or the relay access PLMN list of the remote UE from a core network or serving base stations of candidate relay UEs under a case of being unable to acquire the relay service PLMN list of each candidate relay UE in the candidate relay UE list and/or the relay access PLMN list of the remote UE from the remote UE.

In some embodiments, acquiring the relay service PLMN list of each candidate relay UE in the candidate relay UE list includes:
receiving information of the candidate relay UE reported by the remote UE; and
determining the relay service PLMN list based on the information of the candidate relay UE.

In some embodiments, the information of the candidate relay UE includes at least one of:
identity information of the candidate relay UE;
channel quality information of the candidate relay UE, measured by the remote UE; or relay service PLMN lists of candidate relay UEs.

In some embodiments, determining the target relay set by performing the access/handover decision on each candidate relay UE in the candidate relay UE list based on the PLMN list includes:
determining, based on the relay service PLMN list of each candidate relay UE and/or the relay access PLMN list of the remote UE, an access/handover priority of each candidate relay UE in the candidate relay UE list according to a PLMN selection policy; and
determining the target relay set based on the determined access/handover priority.

In some embodiments, the PLMN selection policy includes at least one of:
in response to a relay service PLMN list of a first relay UE including a current serving PLMN of the remote UE, setting a priority of the first relay UE as a first priority;
in response to a relay service PLMN list of a second relay UE including other PLMN in the relay access PLMN of the remote UE in addition to the current serving PLMN of the remote UE, setting a priority of the second relay UE as a second priority, and the first priority being higher than or equal to the second priority;
in response to a relay service PLMN list of a third relay UE not including a PLMN in the relay access PLMN list of the remote UE, the third relay UE not serving as a candidate relay UE of the remote UE; or
in response to a relay service PLMN list of a fourth relay UE being not acquired, the fourth relay UE not serving as a candidate relay UE of the remote UE.

In some embodiments, determining the target relay set by performing the access/handover decision on each candidate relay UE in the candidate relay UE list according to the determined access/handover priority includes:
in response to a priority of a candidate relay UE being the first priority or the second priority, determining that the candidate relay UE is capable of providing an access/handover service for the remote UE, and obtaining the target relay set based on the determined candidate relay UE.

In some embodiments, in response to the acquired PLMN list being the PLMN list of the serving base station of each candidate relay UE, determining the target relay set by performing the access/handover decision on each candidate relay UE in the candidate relay UE list based on the PLMN list includes:
determining whether a PLMN list of a serving base station of a candidate relay UE overlaps the relay access PLMN list of the remote UE; and
in response to the PLMN list of the serving base station of the candidate relay UE overlapping the relay access PLMN list of the remote UE, adding the candidate relay UE to the target relay set.

In some embodiments, when selecting the target relay UE from the target relay set, the method includes at least one of:
in response to a channel quality of a direct communication interface between the remote UE and a first candidate relay UE being greater than a first threshold, using the first candidate relay UE as the target relay UE, the first candidate relay UE being a relay UE in the target relay set;
in response to a channel quality of a Uu interface of a second candidate relay UE in the target relay set being greater than a second threshold, using the second candidate relay UE as the target relay UE;

in response to a relay link load of a third candidate relay UE in the target relay set being less than a third threshold, using the third candidate relay UE as the target relay UE; or in response to an electric quantity of a fourth candidate relay UE in the target relay set being greater than a fourth threshold, using the fourth candidate relay UE as the target relay UE.

It needs to be noted that, the network device in the embodiments is the device corresponding to the method as illustrated in FIG. 1. The implementation in the above each embodiment is applicable to these embodiments, and may achieve the same technical effects. It needs to be noted that, the network device provided in embodiments of the disclosure may implement all method steps achieved by the method embodiments, and may achieve the same technical effects, and the same part as the method embodiments and the beneficial effects are not repeated in embodiments of the disclosure.

Figure 10:
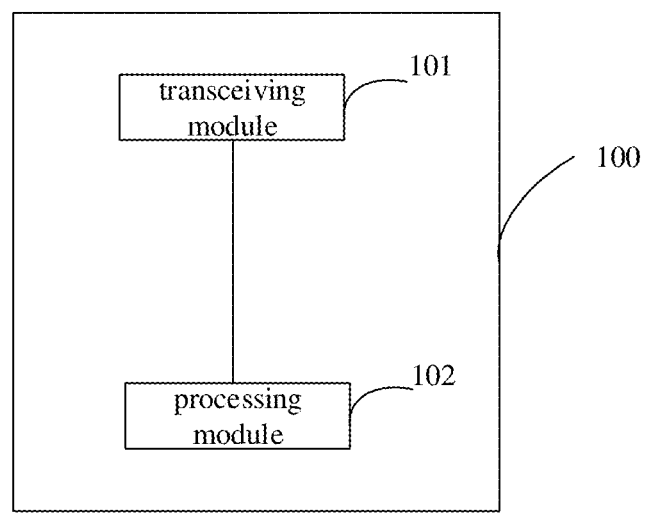
FIG. 10 is a block diagram illustrating an apparatus for selecting a target relay UE in the embodiments of the disclosure.

As illustrated in FIG. 10, an apparatus 100 for selecting a target relay UE is provided in embodiments of the disclosure and applicable to a network device. The apparatus includes a transceiving module 101 and a processing module 102.

The transceiving module 101 is configured to acquire a candidate relay UE list of a remote UE and a PLMN list.

The processing module 102 is configured to determine a target relay set by performing an access/handover decision on each candidate relay UE in the candidate relay UE list based on the PLMN list; and select a target relay UE from the target relay set.

In some embodiments, acquiring the PLMN list includes:
acquiring a relay service PLMN list of each candidate relay UE in the candidate relay UE list and/or a relay access PLMN list of the remote UE; or
acquiring a PLMN list of a serving base station of each candidate relay UE in the candidate relay UE list.

In some embodiments, acquiring the relay service PLMN list of each candidate relay UE in the candidate relay UE list and/or the relay access PLMN list of the remote UE includes:
acquiring the relay service PLMN list of each candidate relay UE in the candidate relay UE list and/or the relay access PLMN list of the remote UE from a PLMN list maintained by the network device; and
acquiring the relay service PLMN list of each candidate relay UE in the candidate relay UE list and/or the relay access PLMN list of the remote UE from the PLMN list maintained by the network device under a case of being able to acquire the relay service PLMN list of each candidate relay UE in the candidate relay UE list and/or the relay access PLMN list of the remote UE from the PLMN list maintained by the network device.

In some embodiments, acquiring the relay service PLMN list of each candidate relay UE in the candidate relay UE list and/or the relay access PLMN list of the remote UE includes:
acquiring the relay service PLMN list of each candidate relay UE in the candidate relay UE list and/or the relay access PLMN list of the remote UE from a PLMN list maintained by the network device; and
acquiring the relay service PLMN list of each candidate relay UE in the candidate relay UE list and/or the relay access PLMN list of the remote UE from a core network or serving base stations of candidate relay UEs under a case of being unable to acquire the relay service PLMN list of each candidate relay UE in the candidate relay UE list and/or the relay access PLMN list of the remote UE from the PLMN list maintained by the network device.

In some embodiments, acquiring the relay service PLMN list of each candidate relay UE in the candidate relay UE list and/or the relay access PLMN list of the remote UE includes:
acquiring the relay service PLMN list of each candidate relay UE in the candidate relay UE list and/or the relay access PLMN list of the remote UE from the remote UE; and
acquiring the relay service PLMN list of each candidate relay UE in the candidate relay UE list and/or the relay access PLMN list of the remote UE from a core network or serving base stations of candidate relay UEs under a case of being unable to acquire the relay service PLMN list of each candidate relay UE in the candidate relay UE list and/or the relay access PLMN list of the remote UE from the remote UE. In some embodiments, acquiring the relay service PLMN list of each candidate relay UE in the candidate relay UE list includes:
receiving information of the candidate relay UE reported by the remote UE; and
determining the relay service PLMN list based on the information of the candidate relay UE.

In some embodiments, the information of candidate relay UEs includes at least one of:
identity information of candidate relay UEs;
channel quality information of candidate relay UEs, measured by the remote UE; or relay service PLMN lists of candidate relay UEs.

In some embodiments, determining the target relay set by performing the access/handover decision on each candidate relay UE in the candidate relay UE list based on the PLMN list includes:
determining, based on the relay service PLMN list of each candidate relay UE and/or the relay access PLMN list of the remote UE, an access/handover priority of each candidate relay UE in the candidate relay UE list according to a PLMN selection policy; and
determining the target relay set based on the determined access/handover priority.

In some embodiments, the PLMN selection policy includes at least one of:
in response to a relay service PLMN list of a first relay UE including a current serving PLMN of the remote UE, setting a priority of the first relay UE as a first priority;
in response to a relay service PLMN list of a second relay UE including other PLMN in the relay access PLMN of the remote UE in addition to the current serving PLMN of the remote UE, setting a priority of the second relay UE as a second priority, and the first priority being higher than or equal to the second priority;
in response to a relay service PLMN list of a third relay UE not including a PLMN in the relay access PLMN list of the remote UE, the third relay UE not serving as a candidate relay UE of the remote UE; or
in response to a relay service PLMN list of a fourth relay UE being not acquired, the fourth relay UE not serving as a candidate relay UE of the remote UE.

In some embodiments, determining the target relay set by performing the access/handover decision on each candidate relay UE in the candidate relay UE list according to the determined access/handover priority includes:
in response to a priority of a candidate relay UE being the first priority or the second priority, determining that the candidate relay UE is capable of providing an access/ handover service for the remote UE, and obtaining the target relay set based on the determined candidate relay UE.

In some embodiments, in response to the acquired PLMN list being the PLMN list of the serving base stations of each candidate relay UE, determining the target relay set by performing the access/handover decision on each candidate relay UE in the candidate relay UE list based on the PLMN list includes:
  determining whether a PLMN list of a serving base station of a candidate relay UE overlaps the relay access PLMN list of the remote UE; and
  in response to the PLMN list of the serving base station of the candidate relay UE overlapping the relay access PLMN list of the remote UE, adding the candidate relay UE to the target relay set.

In some embodiments, when selecting the target relay UE from the target relay set, the method includes at least one of:
  in response to a channel quality of a direct communication interface between the remote UE and a first candidate relay UE being greater than a first threshold, using the first candidate relay UE as the target relay UE, the first candidate relay UE being a relay UE in the target relay set;
  in response to a channel quality of a Uu interface of a second candidate relay UE in the target relay set being greater than a second threshold, using the second candidate relay UE as the target relay UE;
  in response to a relay link load of a third candidate relay UE in the target relay set being less than a third threshold, using the third candidate relay UE as the target relay UE: or
  in response to an electric quantity of a fourth candidate relay UE in the target relay set being greater than a fourth threshold, using the fourth candidate relay UE as the target relay UE.

It needs to be noted that, the apparatus in the embodiments is the apparatus corresponding to the method as illustrated in FIG. 1. The implementation in the above each embodiment is applicable to the embodiments of the apparatus, and may achieve the same technical effects. It needs to be noted that, the apparatus provided in embodiments of the disclosure may implement all method steps achieved by the method embodiments, and may achieve the same technical effects, and the same part as the method embodiments and the beneficial effects are not repeated in embodiments of the disclosure.

A UE is further provided in embodiments of the disclosure and includes: a memory, a transceiver and a processor.

The memory is configured to store a computer program.

The transceiver is configured to transmit and receive data under a control of the processor.

The processor is configured to read the computer program in the memory and perform: acquiring a candidate relay UE list of a remote UE and a PLMN list: determining a target relay set by performing an access/handover decision on each candidate relay UE in the candidate relay UE list based on the PLMN list; and selecting a target relay UE from the target relay set.

In some embodiments, acquiring the PLMN list includes:
  acquiring a relay service PLMN list of each candidate relay UE and/or a relay access PLMN list of the remote UE.

In some embodiments, acquiring the relay service PLMN list of each candidate relay UE includes at least one of:
  acquiring the relay service PLMN list of each candidate relay UE from broadcast information of relay UEs;
  acquiring the relay service PLMN list of each candidate relay UE from discovery messages of relay UEs;
  acquiring the relay service PLMN list of each candidate relay UE from a serving base station of the remote UE; or
  acquiring the relay service PLMN list of each candidate relay UE from a server or a core network.

In some embodiments, determining the target relay set by performing the access/handover decision on each candidate relay UE in the candidate relay UE list based on the PLMN list includes:
  determining whether the relay service PLMN list of each candidate relay UE overlaps the relay access PLMN list of the remote UE, and adding the candidate relay UE to the target relay set in response to overlapping.

In some embodiments, the method for selecting the target relay UE further includes:
  reporting, by the remote UE, information of the determined target relay set to the network device.

In some embodiments, selecting the target relay UE from the target relay set includes:
  receiving, by the remote UE, the target relay UE sent by a source base station of the remote UE. The target relay UE is selected by the source base station of the remote UE from the target relay set.

In some embodiments, selecting the target relay UE from the target relay set includes:
  in response to a channel quality of a direct communication interface between the remote UE and a first candidate relay UE being greater than a first threshold, using the first candidate relay UE as the candidate target relay UE, the first candidate relay UE being a relay UE in the target relay set; and
  sorting all the candidate target relay UEs from high to low based on the channel quality of the direct communication interface between the candidate target relay UE and the remote UE, and preferentially selecting the candidate target relay UE ranking in front as the target relay UE.

It needs to be noted that, the UE in the embodiments is the UE corresponding to the method as illustrated in FIG. 6. The implementation in the above each embodiment is applicable to the embodiments, and may achieve the same technical effects. It needs to be noted that, the UE provided in embodiments of the disclosure may implement all method steps achieved by the method embodiments, and may achieve the same technical effects, and the same part as the method embodiments and the beneficial effects are not repeated in embodiments of the disclosure.

An apparatus for selecting a target relay UE is further provided in embodiments of the disclosure and applicable to a UE. The apparatus includes a transceiving module and a processing module.

The transceiving module is configured to acquire a candidate relay UE list of a remote UE and a PLMN list.

The processing module is configured to determine a target relay set by performing an access/handover decision on each candidate relay UE in the candidate relay UE list based on the PLMN list; and select a target relay UE from the target relay set.

In some embodiments, acquiring the PLMN list includes:
  acquiring a relay service PLMN list of each candidate relay UE and/or a relay access PLMN list of the remote UE.

In some embodiments, acquiring the relay service PLMN list of each candidate relay UE includes at least one of:

acquiring the relay service PLMN list of each candidate relay UE from broadcast information of relay UEs;

acquiring the relay service PLMN list of each candidate relay UE from discovery messages of relay UEs;

acquiring the relay service PLMN list of each candidate relay UE from a serving base station of the remote UE; or acquiring the relay service PLMN list of each candidate relay UE from a server or a core network In some embodiments, determining the target relay set by performing the access/handover decision on each candidate relay UE in the candidate relay UE list based on the PLMN list includes: determining whether the relay service PLMN list of each candidate relay UE overlaps the relay access PLMN list of the remote UE, and adding the candidate relay UE to the target relay set in response to overlapping.

In some embodiments, the method for selecting the target relay UE further includes:

reporting by the remote UE information of the determined target relay set to the network device.

In some embodiments, selecting the target relay UE from the target relay set, includes:

receiving by the remote UE the target relay UE sent by a source base station of the remote UE. The target relay UE is selected by the source base station of the remote UE from the target relay set.

In some embodiments, selecting the target relay UE from the target relay set, includes:

in response to a channel quality of a direct communication interface between the remote UE and a first candidate relay UE being greater than a first threshold, using the first candidate relay UE as the candidate target relay UE, the first candidate relay UE being a relay UE in the target relay set; and sorting all the candidate target relay UEs from high to low based on the channel quality of the direct communication interface between the candidate target relay UE and the remote UE, and preferentially selecting the candidate target relay UE ranking in front as the target relay UE.

It needs to be noted that, the apparatus in the embodiments is the apparatus corresponding to the method as illustrated in FIG. 6. The implementation in the above each embodiment is applicable to the embodiments of the apparatus, and may achieve the same technical effects. It needs to be noted that, the apparatus provided in embodiments of the disclosure may implement all method steps achieved by the method embodiments, and may achieve the same technical effects, and the same part as the method embodiments and the beneficial effects are not repeated in embodiments of the disclosure.

A processor readable storage medium stored with a processor executable instruction is further provided in embodiments of the disclosure. The processor executable instruction is configured to cause a processor to perform the method as described in the above embodiments 1 to 7. All implementations in the above method embodiments are applicable to the embodiments, and may achieve the same technical effects, which will not be repeated herein.

Another processor readable storage medium stored with a processor executable instruction is further provided in embodiments of the disclosure. The processor executable instruction is configured to cause a processor to perform the method as described in the above embodiments 8 to 9. All implementations in the above method embodiments are applicable to the embodiments, and may achieve the same technical effects, which will not be repeated herein.

A computer program product including a computer program code is further provided in embodiments of the disclosure. The computer program code runs on a computer to perform the method as described in the above embodiments 1 to 7. All implementations in the above method embodiments are applicable to the embodiments, and may achieve the same technical effects, which will not be repeated herein.

Another computer program product including a computer program code is further provided in embodiments of the disclosure. The computer program code runs on a computer to perform the method as described in the above embodiments 8 to 9. All implementations in the above method embodiments are applicable to the embodiments, and may achieve the same technical effects, which will not be repeated herein.

A communication apparatus including a processing circuit and an interface circuit is further provided in embodiments of the disclosure. The interface circuit is configured to receive a computer code or instruction, and transmit the computer code or instruction to the processing circuit, and the processing circuit is configured to run the computer code or instruction, to perform the method as described in the above embodiments 1 to 7. All implementations in the above method embodiments are applicable to the embodiments, and may achieve the same technical effects, which will not be repeated herein.

Another communication apparatus including a processing circuit and an interface circuit is further provided in embodiments of the disclosure. The interface circuit is configured to receive a computer code or instruction, and transmit the computer code or instruction to the processing circuit, and the processing circuit is configured to run the computer code or instruction, to perform the method as described in the above embodiments 8 to 9. All implementations in the above method embodiments are applicable to the embodiments, and may achieve the same technical effects, which will not be repeated herein.

A computer program including a computer program code is further provided in embodiments of the disclosure. The computer program code runs on a computer to perform the method as described in the above embodiments 1 to 7. All implementations in the above method embodiments are applicable to the embodiments, and may achieve the same technical effects, which will not be repeated herein.

Another computer program including a computer program code is further provided in embodiments of the disclosure. The computer program code runs on a computer to perform the method as described in the above embodiments 8 to 9. All implementations in the above method embodiments are applicable to the embodiments, and may achieve the same technical effects, which will not be repeated herein.

Those skilled in the related art may realize that, units and algorithm steps of examples described in combination with embodiments of the disclosure may be implemented by electronic hardware or a combination of electronic hardware and computer software. Whether functions are executed by the hardware or the software depends on a specific application and a design constraint of the technical solution. Those skilled in the art may adopt different manners for each specific application to implement the described functions, and such implementation should not be considered beyond the scope of the disclosure.

Those skilled in the art may clearly understand that, a specific working process of a system, an apparatus and a unit described above may refer to a corresponding process in the above method embodiments, which will not be repeated herein.

In embodiments provided in the disclosure, it is to be understood that the disclosed apparatus and method may be implemented in other ways. For example, the apparatus embodiments are merely illustrative, such as division of units, only a logical function division. There may be additional division modes when actual implementation, such as a plurality of units or components may be combined or may be integrated into another system, or some features may be omitted, or not performed. The coupling or direct coupling or communication connection of each other shown or discussed may be an indirect coupling or communication connection through some interfaces, devices, or units, which may be electrical, mechanical or in other forms.

The above units described as separate parts may or may not be physically separated, and the parts shown as units may or may not be physical units, which may be located in one place, or may be distributed to a plurality of network units. Some or all units may be selected according to the actual requirements to achieve the purpose of the disclosure.

In addition, functional units in embodiments of the disclosure may be integrated in a processing unit, or may be physically existed separately, or two or more units may be integrated in one unit.

The above functions may be stored in a computer readable storage memory if implemented in the form of software function units, and sold and used as an independent product. On the basis of such an understanding, the technical solution of the disclosure essentially, partly contributing to the related art in the technical solution, or part of the technical solution may be embodied in the form of software product, and the software product is stored in the storage medium, including several instructions configured to cause a computer device (which may be a personal computer, a server or a network device, etc.) to perform all or part of steps of various embodiments of the disclosure. The forgoing storage medium includes a U disk, a portable hard disk, a Read-Only Memory (ROM), a Random Access Memory (RAM), a magnetic disk or an optical disc and other mediums for storing program codes.

In addition, it should be noted that, in the apparatus and method of the disclosure, it is obvious that each component or each step may be decomposed and/or recombined. Such decomposition and/or recombination should be regarded as an equivalent solution of the disclosure. Also, steps of performing the above series of processings may be performed in chronological order naturally in the description sequence, but not necessarily performed in chronological order, and certain steps may be performed in parallel or independently. All or any steps or components of the method and the apparatus of the disclosure may be understood by those skilled in the art to be implemented in any computing device (including a processor, a storage medium, etc.) or a network of a computing device, in a hardware, firmware, a software, or a combination thereof, which may be implemented by those skilled in the art using their basic programming skills when reading descriptions of the disclosure.

Therefore, an object of the disclosure may further be implemented by running a program or a group of programs on any computing device. The computing device may be a well-known general-purpose device. Therefore, the object of the disclosure may also be implemented merely by providing a program product containing a program code for achieving the method or apparatus. That is, such a program product also constitutes the disclosure, and a storage medium storing such a program product also constitutes the disclosure. Obviously, the storage medium may be any well-known storage medium or any storage medium developed in the future. It should be noted that, in the apparatus and the method of the disclosure, it is obvious that each component or each step may be decomposed and/or recombined. Such decomposition and/or recombination should be regarded as an equivalent solution of the disclosure. Also, steps of performing the above series of processings may be performed in chronological order naturally in the description sequence, but not necessarily performed in chronological order. And certain steps may be performed in parallel or independently.

The foregoing embodiments of the disclosure are preferred. It should be noted that, for those skilled in the art, several improvements and modifications may be made without departing from the principles of the disclosure, and these improvements and modifications are also within the protection scope of the disclosure.

All embodiments of the disclosure may be executed separately or in combination with other embodiments, and are deemed within a protection scope of the disclosure.

What is claimed is:

1. A method for selecting a target relay UE, performed by a network device, the method comprising:
    acquiring a candidate relay UE list of a remote UE and a public land mobile network (PLMN) list;
    determining a target relay set by performing an access/handover decision on each candidate relay UE in the candidate relay UE list based on the PLMN list; and
    selecting a target relay UE from the target relay set;
    wherein acquiring the PLMN list comprises:
        acquiring a relay service PLMN list of each candidate relay UE in the candidate relay UE list and/or a relay access PLMN list of the remote UE; or
        acquiring a PLMN lists of a serving base station of each candidate relay UE in the candidate relay UE list;
    wherein in response to the acquired PLMN list being the PLMN list of the serving base station of each candidate relay UE, determining the target relay set by performing the access/handover decision on each candidate relay UE in the candidate relay UE list based on the PLMN list comprises:
        determining whether a PLMN list of a serving base station of a candidate relay UE overlaps the relay access PLMN list of the remote UE; and
        in response to the PLMN list of the serving base station of the candidate relay UE overlapping the relay access PLMN list of the remote UE, adding the candidate relay UE to the target relay set.

2. The method according to claim 1, wherein acquiring the relay service PLMN list of each candidate relay UE in the candidate relay UE list and/or the relay access PLMN list of the remote UE comprises:
    acquiring the relay service PLMN list of each candidate relay UE in the candidate relay UE list and/or the relay access PLMN list of the remote UE from a PLMN list maintained by the network device.

3. The method according to claim 1, wherein acquiring the relay service PLMN list of each candidate relay UE in the candidate relay UE list and/or the relay access PLMN list of the remote UE comprises:
    acquiring the relay service PLMN list of each candidate relay UE in the candidate relay UE list and/or the relay access PLMN list of the remote UE from a core network or serving base stations of candidate relay UEs.

4. The method according to claim 1, wherein acquiring the relay service PLMN list of each candidate relay UE in the candidate relay UE list and/or the relay access PLMN list of the remote UE comprises:
    acquiring the relay service PLMN list of each candidate relay UE in the candidate relay UE list and/or the relay access PLMN list of the remote UE from the remote UE; or
    acquiring the relay service PLMN list of each candidate relay UE in the candidate relay UE list and/or the relay access PLMN list of the remote UE from a core network or serving base stations of candidate relay UEs.

5. The method according to claim 1, wherein acquiring the relay service PLMN list of each candidate relay UE in the candidate relay UE list comprises:
    receiving information of the candidate relay UE reported by the remote UE; and
    determining the relay service PLMN list based on the information of the candidate relay UE.

6. The method according to claim 5, wherein the information of the candidate relay UE comprises at least one of:
    identity information of the candidate relay UE;
    channel quality information of the candidate relay UE, measured by the remote UE; or
    relay service PLMN lists of candidate relay UEs.

7. The method according to claim 1, wherein determining the target relay set by performing the access/handover decision on each candidate relay UE in the candidate relay UE list based on the PLMN list comprises:
    determining, based on the relay service PLMN list of each candidate relay UE and/or the relay access PLMN list of the remote UE, an access/handover priority of each candidate relay UE in the candidate relay UE list according to a PLMN selection policy; and
    determining the target relay set based on the determined access/handover priority.

8. The method according to claim 7, wherein the PLMN selection policy comprises at least one of:
    in response to a relay service PLMN list of a first relay UE comprising a current serving PLMN of the remote UE, setting a priority of the first relay UE as a first priority;
    in response to a relay service PLMN list of a second relay UE comprising other PLMN in the relay access PLMN of the remote UE in addition to the current serving PLMN of the remote UE, setting a priority of the second relay UE as a second priority, and the first priority being higher than or equal to the second priority;
    in response to a relay service PLMN list of a third relay UE not comprising a PLMN in the relay access PLMN list of the remote UE, the third relay UE not serving as a candidate relay UE of the remote UE; or
    in response to a relay service PLMN list of a fourth relay UE being not acquired, the fourth relay UE not serving as a candidate relay UE of the remote UE.

9. The method according to claim 8, wherein determining the target relay set by performing the access/handover decision on each candidate relay UE in the candidate relay UE list according to the determined access/handover priority comprises:
    in response to a priority of a candidate relay UE being the first priority or the second priority, determining that the candidate relay UE is capable of providing an access/handover service for the remote UE, and obtaining the target relay set based on the determined candidate relay UE.

10. The method according to claim 1, wherein when selecting the target relay UE from the target relay set, the method comprises at least one of:
    in response to a channel quality of a direct communication interface between the remote UE and a first candidate relay UE being greater than a first threshold, using the first candidate relay UE as the target relay UE, the first candidate relay UE being a relay UE in the target relay set;
    in response to a channel quality of a Uu interface of a second candidate relay UE in the target relay set being greater than a second threshold, using the second candidate relay UE as the target relay UE;
    in response to a relay link load of a third candidate relay UE in the target relay set being less than a third threshold, using the third candidate relay UE as the target relay UE; or
    in response to an electric quantity of a fourth candidate relay UE in the target relay set being greater than a fourth threshold, using the fourth candidate relay UE as the target relay UE.

11. A network device, comprising a memory, a transceiver and a processor;
    wherein the memory is configured to store a computer program;
        the transceiver is configured to transmit and receive data under a control of the processor; and
        the processor is configured to read the computer program in the memory and perform the method of claim 1.

12. A method for selecting a target relay UE, performed by a remote UE, the method comprising:
    acquiring a candidate relay UE list of the remote UE and a public land mobile network (PLMN) list;
    determining a target relay set by performing an access/handover decision on each candidate relay UE in the candidate relay UE list based on the PLMN list; and
    selecting a target relay UE from the target relay set;
    wherein determining the target relay set by performing the access/handover decision on each candidate relay UE in the candidate relay UE list based on the PLMN list comprises:
        determining whether the relay service PLMN list of each candidate relay UE overlaps the relay access PLMN list of the remote UE, and adding the candidate relay UE to the target relay set in response to overlapping.

13. The method according to claim 12, wherein acquiring the PLMN list comprises:
    acquiring a relay service PLMN list of each candidate relay UE and/or a relay access PLMN list of the remote UE.

14. The method according to claim 13, wherein acquiring the relay service PLMN list of each candidate relay UE comprises at least one of:
    acquiring the relay service PLMN list of each candidate relay UE from broadcast information of relay UEs;
    acquiring the relay service PLMN list of each candidate relay UE from discovery messages of relay UEs;
    acquiring the relay service PLMN list of each candidate relay UE from a serving base station of the remote UE; or
    acquiring the relay service PLMN list of each candidate relay UE from a server or a core network.

15. The method according to claim 12, further comprising:

reporting, by the remote UE, information of the determined target relay set to the network device;

wherein selecting the target relay UE from the target relay set comprises:

receiving, by the remote UE, the target relay UE sent by a source base station of the remote UE, wherein the target relay UE is selected by the source base station of the remote UE from the target relay set.

16. The method according to claim 12, wherein selecting, by the remote UE, the target relay UE from the target relay set comprises:

in response to a channel quality of a direct communication interface between the remote UE and a first candidate relay UE being greater than a first threshold, using the first candidate relay UE as the candidate target relay UE, the first candidate relay UE being a relay UE in the target relay set; and sorting all the candidate target relay UEs from high to low based on the channel quality of the direct communication interface between the candidate target relay UE and the remote UE, and preferentially selecting the candidate target relay UE ranking in front as the target relay UE.

17. A UE, comprising a memory, a transceiver and a processor; wherein the memory is configured to store a computer program;

the transceiver is configured to transmit and receive data under a control of the processor; and the processor is configured to read the computer program in the memory and perform:

acquiring a candidate relay UE list of the remote UE and a public land mobile network (PLMN) list;

determining a target relay set by performing an access/handover decision on each candidate relay UE in the candidate relay UE list based on the PLMN list; and selecting a target relay UE from the target relay set;

wherein the processor is further configured to perform:

determining whether the relay service PLMN list of each candidate relay UE overlaps the relay access PLMN list of the remote UE, and adding the candidate relay UE to the target relay set in response to overlapping.

* * * * *